(No Model.) 2 Sheets—Sheet 1.

T. W. POWELL.
POTATO PLANTER AND FERTILIZER DISTRIBUTER.

No. 373,945. Patented Nov. 29, 1887.

Witnesses
M. Fowler
E. G. Siggers

Inventor
Thomas W. Powell
By his Attorneys
C. A. Knowles

N. PETERS, Photo-Lithographer, Washington, D. C.

(No Model.) 2 Sheets—Sheet 2.
T. W. POWELL.
POTATO PLANTER AND FERTILIZER DISTRIBUTER.
No. 373,945. Patented Nov. 29, 1887.
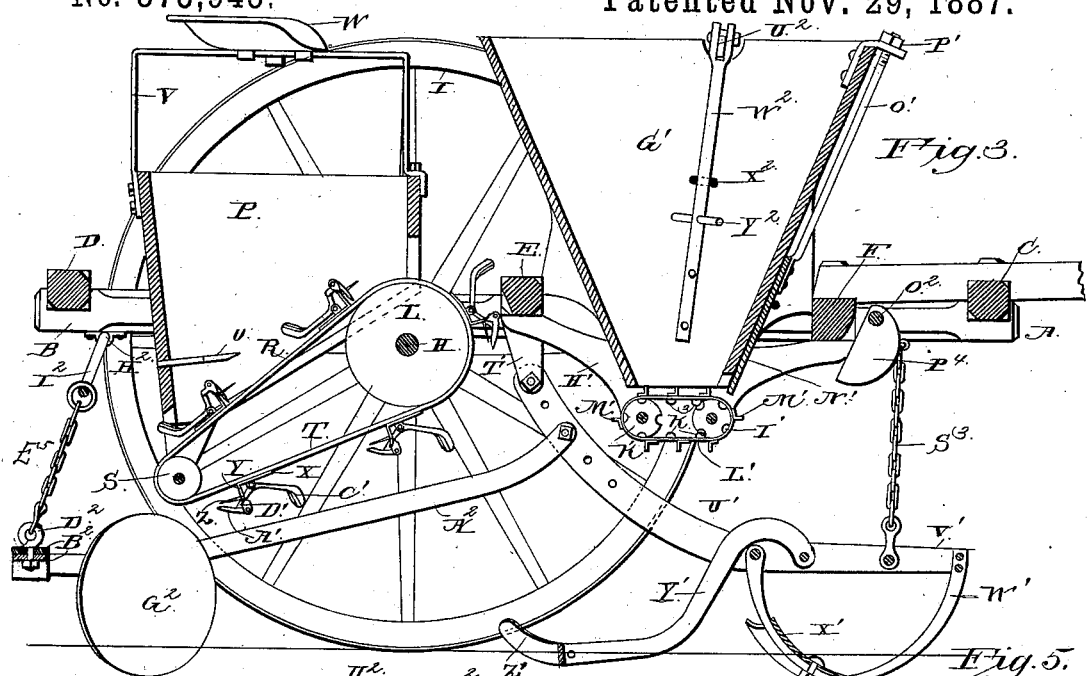
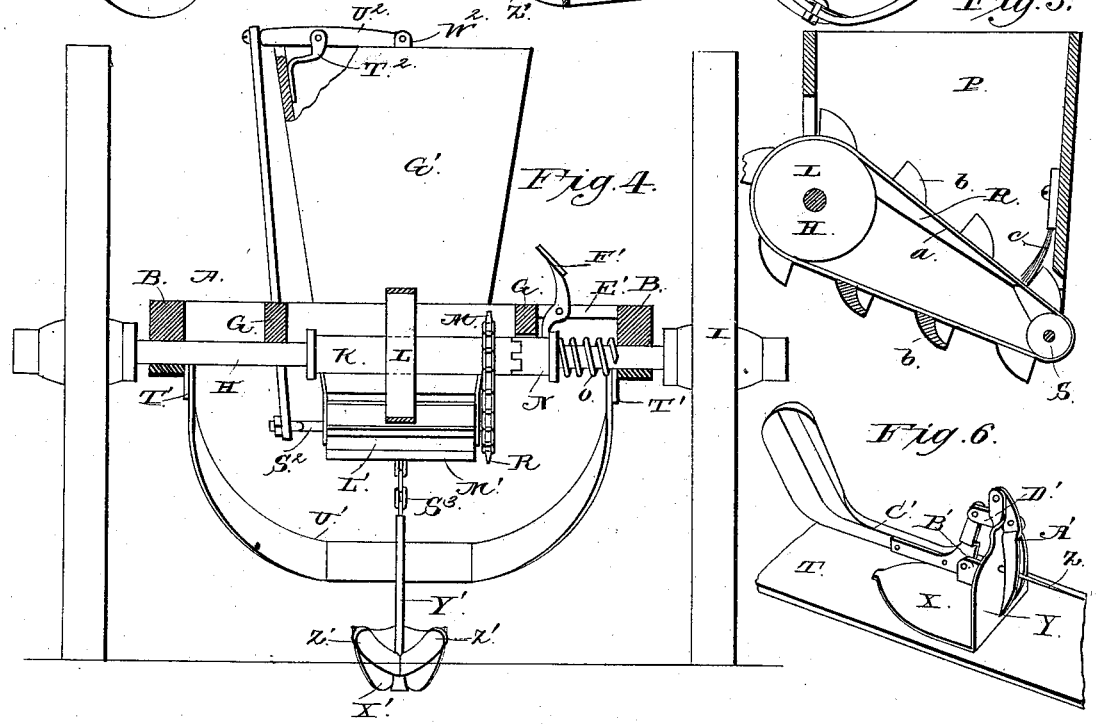
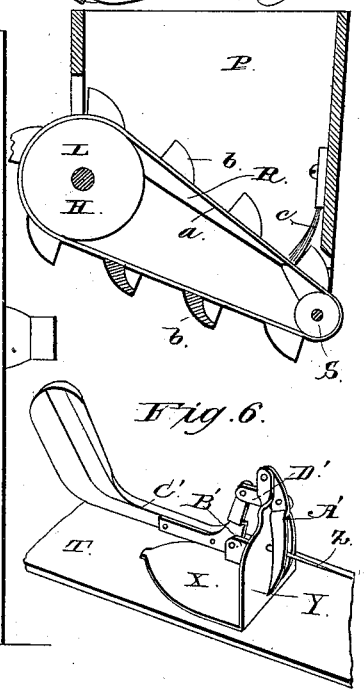
Witnesses
Inventor
Thomas W. Powell
By his Attorneys

UNITED STATES PATENT OFFICE.

THOMAS WHITNEY POWELL, OF FLUSHING, NEW YORK.

POTATO-PLANTER AND FERTILIZER-DISTRIBUTER.

SPECIFICATION forming part of Letters Patent No. 373,945, dated November 29, 1887.

Application filed October 4, 1887. Serial No. 251,461. (No model.)

*To all whom it may concern:*

Be it known that I, THOMAS WHITNEY POWELL, a citizen of the United States, residing at Flushing, in the county of Queens and State of New York, have invented a new and useful Improvement in Potato-Planters and Fertilizer-Distributers, of which the following is a specification.

My invention relates to an improvement in potato planters and fertilizer-distributers; and it consists in the peculiar construction and combination of devices that will be more fully set forth hereinafter, and particularly pointed out in the claims.

Figure 1:
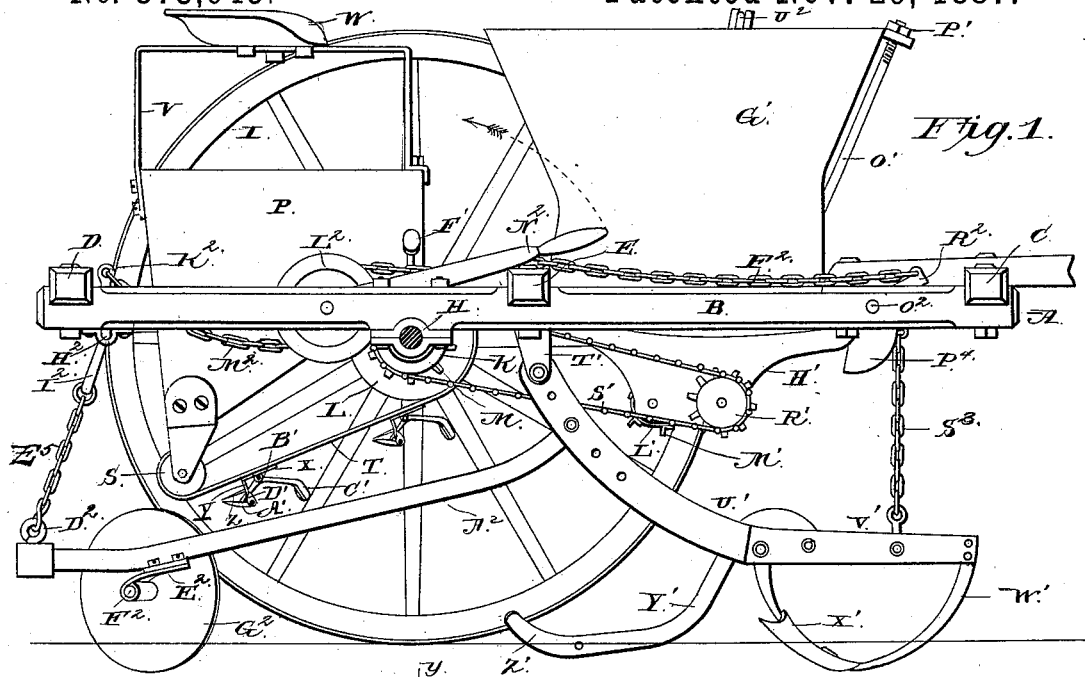
Figure 2:
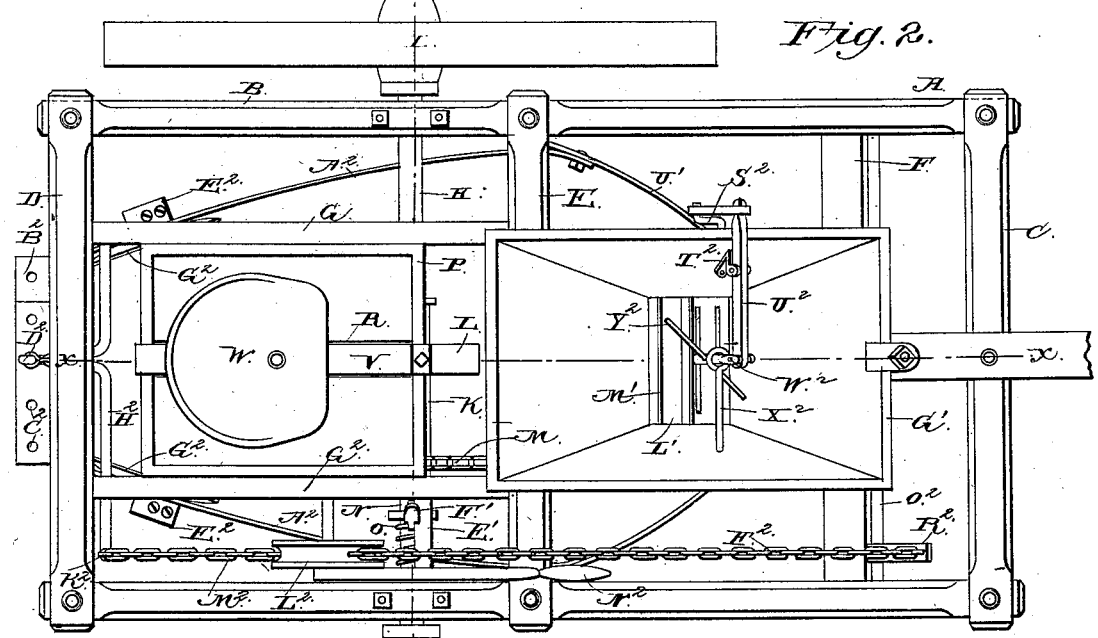

In the accompanying drawings, Figure 1 is a side elevation of my invention with the near wheel removed. Fig. 2 is a top plan view of the same. Fig. 3 is a vertical longitudinal central sectional view taken on the line $x\,x$ of Fig. 2. Fig. 4 is a vertical transverse sectional view taken on the line $y\,y$ of Fig. 2. Fig. 5 is a detail sectional view showing the form of belt used in planting corn. Fig. 6 is a detail view.

A represents a rectangular frame, which comprises a pair of side bars, B, a front cross-bar, C, a rear cross-bar, D, a central cross-bar, E, a cross-bar, F, which is arranged at a suitable distance in rear of the bar C, and a pair of parallel longitudinal bars, G, which connect the rear cross-bar, D, and the central cross-bar, E, the said longitudinal bars being arranged at a suitable distance from the bars B. On the under side of the frame, at a suitable distance in rear of the center thereof, is journaled a shaft, H, to which are secured a pair of driving and supporting wheels, I.

K represents a sleeve which is loosely secured on the central portion of the said shaft, and is provided with a pulley, L, secured near its center, and a sprocket-wheel, M, secured near one end. One end of the said sleeve is provided with notches adapted to be engaged by a sliding clutch, N, which is feathered on the shaft. A spring, O, is secured on the shaft and bears against the sliding clutch and serves to keep the latter normally engaged with the slide, so as to lock the latter rigidly to the shaft and cause it to rotate thereon.

P represents a hopper which is arranged between the bars G and is secured thereto. The bottom of the said hopper inclines downward and rearward at an angle of about forty-five degrees, as shown, and is provided with a longitudinal opening, R, which is arranged in line with the pulley L. Under the lower end of the hopper is journaled a roller, S.

T represents an endless belt, which passes over the said roller and over the pulley L, and the upper side of this belt works in the opening R in the bottom of the hopper.

U represents a forwardly-extending spring-arm which is secured to the rear wall of the hopper and is arranged over the endless belt. On the upper side of the hopper, at the center thereof, is secured a longitudinal supporting-yoke, V, to which is secured a longitudinally-adjustable seat, W, for the driver.

Secured to the endless belt T, at suitable regular distances apart, are a number of right-angle plates, X, having the vertical front portions, Y, arranged at right angles to the belt. From the said vertical portions Y project pins or studs Z, which point in the direction in which the belt rotates, and to the upper end of each vertical plate Y is pivoted an ejecting-arm, A', having its lower end bifurcated to receive the pin or stud Z.

On the upper sides of the horizontal portions X of the plates are formed lugs B', to which are pivoted the front ends of rearwardly-extending weighted arms C'. The front ends of the said arms C' are upturned and are connected to the arms A' by means of links D'.

From the foregoing description it will be understood that the arms C', on the upper side of the belt, will lie flat thereon while passing forward through the opening R in the bottom of the hopper, and will thereby keep the arms A' drawn rearwardly against the plates Y. As the said plates Y move forward and upward through the hopper the pins or studs Z will stick into one or more pieces of the potatoes in the hopper, and will thereby carry the same through the opening in the front end of the hopper. As each plate X passes downward over the pulley M its arm C' will be turned to a vertical position, and the weight at the free end of the said arm will tilt the arm forward, and thereby cause the ejecting-arm A' to move forward on the pin or stud, and consequently force the piece of potato from the said pin or stud and cause the same to drop into the furrow under the machine, as will be very readily understood. One of the beams G is connected to the adjacent beam B by means of the short cross-bar E'. A lever, F', is pivoted to the said cross-bar, and the lower end of the said lever engages the clutch. The driver seated on the seat W is enabled to operate the lever F' with one foot, so as to cause the lever to disengage the sleeve on the driving-shaft, and thereby cause the shaft to rotate while the sleeve remains stationary, and consequently cause the planting mechanism, previously described, to cease to operate.

G' represents a hopper, which is arranged in front of the hopper P, and is supported by the cross-bars F and E. The front rear walls of the said hopper G' are inclined, as shown, and the lower end of the hopper is open.

H' represents a pair of vertical longitudinal plates, which have their extremities attached to the under sides of the cross-bars E and F. The said plates have their upper edges bearing against the outer sides of the lower portion of the hopper. In the lower portion of the said plates are journaled a pair of rollers, I' and K'. An endless belt, L', connects the said rollers, and is provided on its inner side at suitable regular distances apart with semi-cylindrical cleats K³, which enter similarly-shaped grooves made in the rollers, and thereby prevent the belt from slipping on the rollers. On the outer side of the belt, at suitable regular distances apart, are transverse bucket-plates M', which serve to catch the fertilizer in the bottom of the hopper and force the same therefrom and drop it in the furrow in advance of the potatoes.

The front side of the hopper is provided at its lower end with a discharge-opening, which is covered by a vertically-movable spring slide-plate, N'. The said slide-plate is operated by means of a rod, O', the upper end of which extends through an ear or bracket, which extends through the front side of the hopper, and is provided with a nut, P', which works on the threaded upper extremity of the rod, and thereby enables the same to be raised or lowered, so as to move the plate N', and consequently regulate the size of the discharge-opening, and thereby regulate the quantity of the fertilizer that is being distributed. The plate N' being resilient enables hard substances to be discharged without injury to the machine. One end of the roller I' is provided with a small sprocket-wheel, R', which is connected to the sprocket-wheel M by means of an endless chain, S', and thereby the rotation of the main shaft is imparted to the endless belt at the bottom of the hopper G', as will be readily understood.

S² represents a crank-arm which is on the opposite end of the roller I'. From the upper side of one of the walls of the hopper G' projects an inwardly-extending arm, T², to which is fulcrumed a lever, U². The outer end of this lever is connected to the crank S², and the inner side of the end of the lever is pivoted to the upper end of a vertical agitator rod, W², which extends downward in the hopper and is guided by an arm, X². The said agitator-rod is provided with a series of projecting fingers, Y². As the roller I' rotates its crank-arm imparts reciprocating motion to the pitman, and the same is transmitted to the agitator by means of the lever U², as will be very readily understood, thereby causing the agitator to stir the fertilizer in the hopper.

T' represents a pair of brackets which depend from the center of the bars B.

U' represents a yoke which is substantially in the form of the letter U, and has a forwardly-projecting central arm, V'. The rear ends of the said yoke are pivoted to the brackets T'.

W' represents a semicircular runner which has its ends attached to the extremities of the arm V' and depends from the said arm. To the rear portion of this runner is secured a furrow-opening shovel or plow, X'.

Y' represents an arm which is curved in segmoidal form, and has its front end pivoted between the sides of the arm W'. The said arm Y' extends rearwardly, and its rear end is bifurcated and curved outwardly in opposite directions, so as to form fenders Z', which operate in rear of the furrow-opener and serve to clear away the trash from both sides of the furrow, and to stir the soil and mix the fertilizer therewith.

A² represents a pair of rearwardly-extending converging curved arms which have their front ends pivotally attached to the arms of the yoke U' and longitudinally adjustable thereon. To the rear ends of the said arms A² are attached transverse connecting-arms B², which overlap each other, and are provided with a series of openings, C², which are adapted to align with each other, and through which a link, D², passes, so as to connect the said arms together and thereby secure the rear ends of the arms A² at any desired distance apart.

E² represents a pair of brackets which project outwardly from the arms A² at a suitable distance from the ends thereof. In the said brackets are journaled spindles F², to the inner ends of which are attached concaved circular covering-disks G², which are arranged on the inner sides of the arms A². Owing to the fact that the said arms converge at their rear ends, the said covering-disks are arranged obliquely to the line of draft, and one of the said disks is caused to operate on each side of the furrow, and as the machine moves forward the said disks serve to throw the dirt on the opposite sides of the furrow into the same, and thereby cover the potatoes and the fertilizer, and complete the operation of planting the same.

H² represents a transverse rock-shaft which is journaled in bearings on the under side of the bars G, near the rear ends thereof. At the center of this rock-shaft is an outwardly-extending crank-arm, I², to which is connected a chain, E⁵, connected with link D², and at one end thereof is an upwardly-extending crank-arm, K².

L² represents a drum which is journaled on a suitable spindle that connects one of the bars G with one of the bars B. A chain, M², is attached to the under side of this drum and to the upper end of the crank K².

N² represents a lever-arm which is attached to the drum and projects upward therefrom.

Near the front end of the frame A is journaled a transverse rock-shaft, O², provided at its center with a cam, P⁴, and near one end with a crank-arm, R². A chain, S³, connects the cam with the arm V', and a chain, F², connects the crank-arm R² with the upper side of the drum L². By turning the arm N² rearward the drum L² will be caused to wind up the chains attached thereto, and thereby cause the rock-shafts at opposite ends of the frame to partly rotate, so as to raise the furrow-opener, the fender, and the covering-disks from the ground. By moving the said arm N² forward the drum will be caused to unwind the chains, and consequently the furrow-opener, the fender, and the covering-disks will be lowered to the ground.

In order to adapt the machine for use in planting corn, peas, or beans, I discard the belt T and its attachments and substitute a belt, a, therefor, which is provided on its upper side with a series of seed-cups, b. The spring U is also removed from the hopper P, and a brush, c, is secured to the rear side of the said hopper by means of a screw, the said brush serving to close the opening at the rear end of the hopper, and thereby prevent the seeds from dropping from the same.

The operation of my invention will be very readily understood from the foregoing description in connection with the drawings.

Having thus described my invention, I claim—

1. In a potato-planter, the combination of the endless belt movable on suitable pulleys or rollers, the plates Y, projecting outward from the outer side of the said belt and having the forwardly-extending pins or spurs, ejector-arms A', pivoted to the said plates, and the pivoted weighted arms connected to the ejector-arms and adapted to move the latter forward on the pins or studs as the belt passes over the rollers or pulleys, for the purpose set forth, substantially as described.

2. The combination, in a potato-planter, of the hopper P, having the longitudinal opening in its lower side, the endless belt arranged on suitable rollers or pulleys and having its upper side arranged in the said opening, the plates projecting from the outer side of the said belt and having forward-extending spurs or pins and the ejector-arms and the weighted levers connected thereto, for the purpose set forth, substantially as described.

3. The combination, in a potato-planter, of the hopper P, having the inclined lower side provided with the longitudinal opening R, the endless belt guided on suitable rollers or pulleys having its upper side arranged in the said opening, the plates projecting from the outer side of the said belt and having the forward-extending studs or pins, the ejector-arms pivoted to the said plates, the weighted levers pivotally connected to the belts and connected to the ejector-arms to operate the latter, for the purpose set forth, and the spring U, arranged over the upper side of the belt, substantially as described.

4. The combination of the hopper G', the rollers journaled at the lower end of the said hopper, one of the said rollers being provided with the crank S², the endless belt connecting the said rollers and arranged under the discharge end of the hopper, the lever U², pivoted at the upper end of the hopper and extending inwardly in the same, the pitman connecting the outer end of the said lever to the crank S², and the vertically-movable agitator-rod attached to the inner end of the hopper and provided with the projecting fingers, substantially as described.

5. The combination, in a planter, of the yoke U', pivoted under the same and having the forward-extending arm V', the curved runner W', depending from the said arm, and the furrow-opening shovel attached to the rear portion of the said runner, substantially as described.

6. The combination, in a planter, of the yoke U', extending forward under the same, the furrow-opening shovel connected to the said yoke, and the rearward-extending arm Y', arranged in rear of the furrow-opener and having the rearward-diverging fenders Z', substantially as described.

7. The combination, in a planter, of the frame A, the yoke U', pivoted under the frame and extending forward and provided with the forward-extending arm V', the runner W', depending from the said arm, the furrow-opening shovel attached to the rear portion of the said runner, the curved arm Y', having its front end pivoted to the arm V' and provided at its rear end with the rearward-diverging fenders Z', and means to raise and lower the front end of the yoke, for the purpose set forth, substantially as described.

8. The combination, in a planter, of the frame, the yoke U', pivoted under the same and extending forward, said yoke carrying the furrow-opening shovel, the arms A², having their front ends pivotally connected to the yoke and converging at their rear ends, the transverse arms V², connecting the rear ends of the arms A², the covering-disks journaled to the arms A² and arranged obliquely to the line of draft, the rock-shafts at opposite ends of the frame having the arms and the chains connecting the same to the yoke and to the arms A², and the lever connected to the said rock-shafts and adapted to turn the same simultaneously to raise or lower the furrow-opener and the covering-disks, substantially as described.

9. The combination, in a combined fertilizer-distributer and planter, of the frame A, the hopper G', secured thereto, the rollers journaled under the said hopper, the endless belt connecting the said rollers arranged under the discharge-opening of the hopper, the hopper P, arranged in rear of the hopper G' and having the inclined lower side, the roller S, journaled under the rear end of hopper P, the main shaft journaled to the frame and having the pulley M and the sprocket-wheel N, the endless belt connecting the pulley M and the roller S, and having its upper side arranged in the opening of the lower side of hopper P, and the chain connecting the sprocket-wheel N with the sprocket-wheel R' on one of the rollers under the hopper G', substantially as described.

10. The combination, in a combined fertilizer-distributer and planter, of the frame, the hopper G', secured thereto, the rollers journaled under the discharge-opening of the hopper, one of the said rollers being provided with a sprocket-wheel, the endless belt connecting the rollers, the hopper P, arranged in rear of hopper G', the roller S, journaled under the rear of hopper P, the driving-shaft journaled under the frame, the sleeve loosely fitted on the said driving-shaft and having the pulley M and the sprocket-wheel N rigidly attached thereto, the clutch to connect the sleeve to the shaft and disconnect the same therefrom, the endless belt connecting the roller S and the pulley M and having its upper side arranged in the discharge-opening of hopper P, and the endless chain connecting the sprocket-wheel N and the sprocket-wheel R' on one of the rollers under the hopper G', all combined and arranged to operate substantially as described.

In testimony that I claim the foregoing as my own I have hereto affixed my signature in presence of two witnesses.

THOMAS WHITNEY POWELL.

Witnesses:
WM. VAN SICLEN,
WM. H. TOWNSEND.